(12) United States Patent
Albright et al.

(10) Patent No.: US 11,416,475 B2
(45) Date of Patent: Aug. 16, 2022

(54) BLOCK QUANTITY REDUCTION IN DISTRIBUTED LEDGERS

(71) Applicant: ADOBE INC., San Jose, CA (US)

(72) Inventors: Matthew Keith Albright, Mountain View, CA (US); Shriram Venkatesh Shet Revankar, San Jose, CA (US)

(73) Assignee: Adobe Inc., San Jose, CA (US)

( * ) Notice: Subject to any disclaimer, the term of this patent is extended or adjusted under 35 U.S.C. 154(b) by 469 days.

(21) Appl. No.: 16/165,810

(22) Filed: Oct. 19, 2018

(65) Prior Publication Data

US 2020/0125661 A1    Apr. 23, 2020

(51) Int. Cl.
*G06F 16/23* (2019.01)
*H04L 9/06* (2006.01)

(52) U.S. Cl.
CPC ........ *G06F 16/2379* (2019.01); *H04L 9/0637* (2013.01)

(58) Field of Classification Search
CPC ........................... G06F 16/2379; H04L 9/0637
See application file for complete search history.

(56) References Cited

U.S. PATENT DOCUMENTS

| | | | |
|---|---|---|---|
| 9,774,578 B1* | 9/2017 | Ateniese | H04L 9/3242 |
| 10,713,727 B1* | 7/2020 | Floyd | G07C 5/008 |
| 2016/0292672 A1* | 10/2016 | Fay | G06Q 20/3829 |
| 2017/0031676 A1* | 2/2017 | Cecchetti | H04L 9/3236 |
| 2017/0053249 A1* | 2/2017 | Tunnell | G06Q 20/065 |
| 2017/0116693 A1* | 4/2017 | Rae | H04L 9/3236 |

* cited by examiner

*Primary Examiner* — Miranda Le
(74) *Attorney, Agent, or Firm* — Shook, Hardy & Bacon L.L.P.

(57) ABSTRACT

Embodiments of the present invention provide systems, methods, and computer storage media directed to reducing a size of a blockchain. In implementation, upon identifying an indication to reduce a size of a blockchain, a set of blocks to remove from the blockchain can be determined. The set of blocks can then be removed from the blockchain to reduce the size of the blockchain thereby reducing the amount of memory used by the blockchain.

18 Claims, 7 Drawing Sheets

BLOCK QUANTITY REDUCTION IN DISTRIBUTED LEDGERS

BACKGROUND

Generally, in a blockchain technology environment, a requested transaction (e.g., representing cryptocurrency, contracts, records, or other information) is broadcast to various nodes in a blockchain network. Upon the network of nodes verifying the transaction, the transaction can be used, alone or in association with other transactions, to create a new block of data. The new block of data can then be added to an existing blockchain. Blocks continue to be added to the blockchain as new blocks are created in accordance with verified transactions. Accordingly, as the number of transactions increase, the number of blocks added to a blockchain increase. However, as a blockchain becomes larger due to an increased number of blocks, more memory is consumed by the blockchain.

SUMMARY

Embodiments of the present invention relate to facilitating reduction of block quantity within blockchains or distributed ledgers. More specifically, systems and methods are disclosed relating to a distributed ledger-based system that reduces the number of blocks in a blockchain. In this regard, blocks within a blockchain can be removed or deleted such that the size of the blockchain is reduced thereby decreasing the amount of memory utilized. As described, blocks within a blockchain are removed upon identifying a trigger indicating that a blockchain size reduction should occur. An amount of blocks and/or particular blocks to remove can be determined, for example, based on a default value, a type of trigger identified, or the like. To track the transactions in the blocks to be removed, a transaction state summarizing or representing the transactions can be determined and utilized as a reference for the blocks maintained in the blockchain. For example, a transaction state representing transactions in the removed blocks may be included in a first block in the blockchain.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
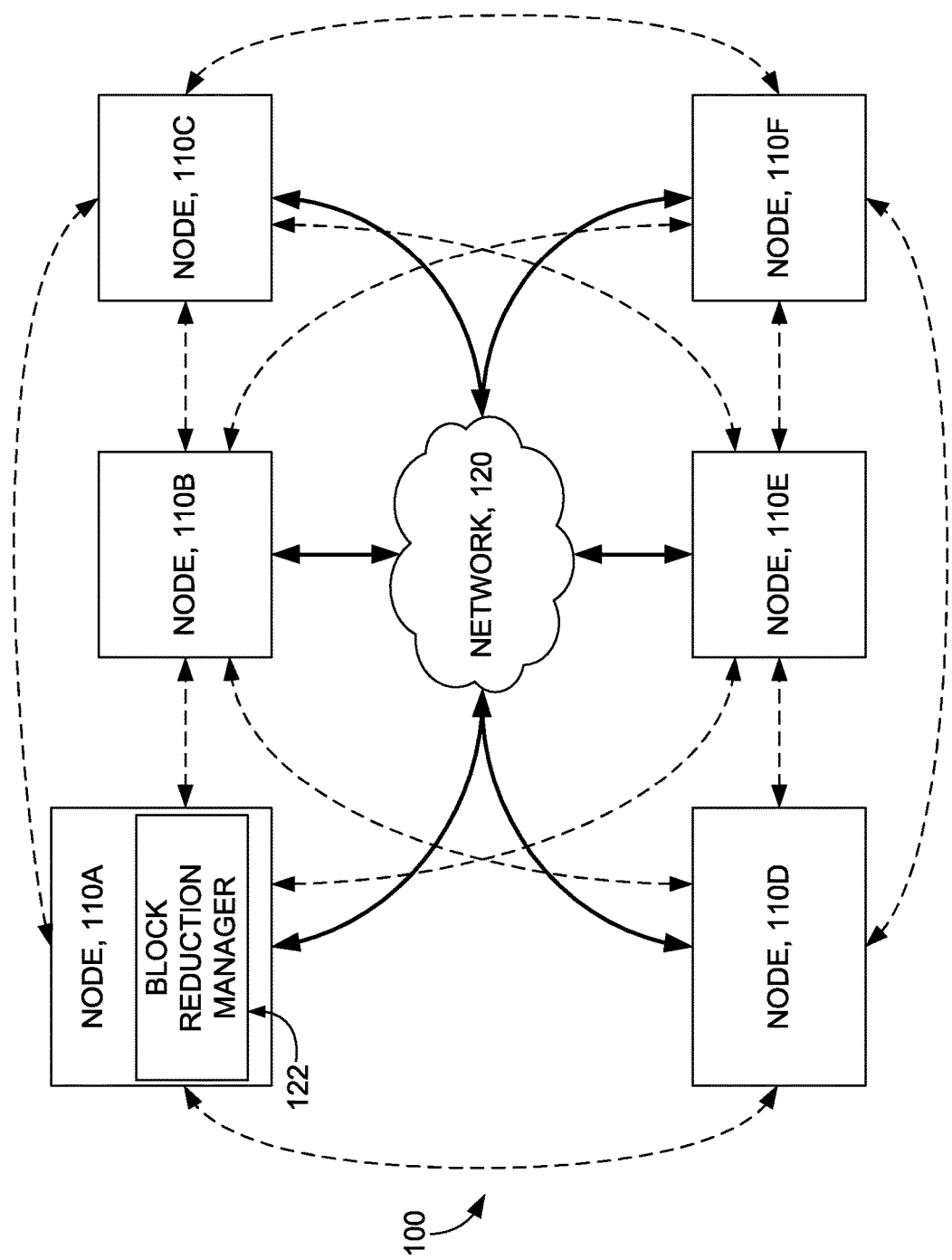
FIG. 1 is an exemplary system diagram of a distributed ledger network in accordance with some embodiments of the present invention.

A distributed ledger environment includes various nodes that operate as peers to other nodes. Each node includes a decentralized distributed ledger, or blockchain, that is used to record transactions in the form of blocks, which are linked using cryptography. Generally, upon creating a block having one or more verified transactions and obtaining a consensus (e.g., greater than 50%) among nodes validating blocks, a block is added to the blockchain.

Typically, distributed ledgers include all validated transactions. As such, the number of blocks in the distributed ledgers are constantly increasing as transactions are validated. An increasing size of distributed ledgers, or blockchains, however, increases utilization of memory on each node.

Accordingly, embodiments of the present disclosure are directed to reducing block quantity in distributed ledgers or blockchains. In particular, blocks within the blockchain can be removed or deleted such that the size of the distributed ledger is reduced. Advantageously, reducing a size of a distributed ledger reduces the amount of memory consumed by the distributed ledger and thereby improves the node operation.

In implementation, and at a high level, block reducing technology can be utilized at each node to determine when to reduce or remove blocks from a distributed ledger and an amount of blocks to remove from the distributed ledger. In particular, a size reduction trigger can be detected, for example, based on a size of the blockchain, a number of blocks within the blockchain, a rate of block change, or the like. In accordance with detecting a size reduction trigger, a size reduction amount can be identified and applied to the blockchain to reduce the size of the blockchain. By way of example only, upon a size of the blockchain exceeding a threshold value of 1,000 blocks, 500 blocks may be removed from the blockchain (e.g., a first set of 500 blocks in the blockchain). In embodiments, a state of the transactions recorded in the blocks to be removed from the blockchain may be determined and recorded (e.g., at new block 0 in the blockchain). Such a recorded transaction state can capture a representation (e.g., value, currency value) of the transactions being removed for reference by blocks maintained in the blockchain.

Various terms and phrases are used herein to describe aspects of the disclosed technology. Some of these terms/phrases are described here to provide an overview:

A block reduction trigger generally refers to a trigger, such as an event, result, attribute, or the like, that triggers or indicates a block size reduction should occur. In this regard, identification of a block reduction trigger can initiate a reduction of blocks within a blockchain.

A size reduction amount refers to an indication of an amount or size to reduce a blockchain. A size reduction amount may be a number of blocks, a block number, a size of blocks, a percent of blocks, a set of blocks (e.g., identified by block numbers), or the like.

A transaction state generally refers to a summary or representation of a state of transactions associated with blocks identified to remove from the blockchain.

Turning now to FIG. 1, a schematic depiction is provided illustrating an exemplary distributed ledger network 100 in which some embodiments of the present invention may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The distributed ledger network 100 depicted in FIG. 1 includes a plurality of nodes 110A-110F that are each in communication with one or more nodes 110A-110F over a network, such as the Internet. In accordance with the present disclosure, each node 110A-110F is a node of a distributed ledger network, as later described in accordance with FIG. 3. In some embodiments, particularly for public blockchain implementations, each node 110A-110F in the distributed ledger network 100 can operate as a peer to every other node 110A-110F of the distributed ledger network 110 such that a single node 110A-110F is not more influential or powerful than any other node 110A-110F. Operations performed by nodes can include, among other things, validating transactions, verifying blocks of transactions, and adding records to an immutable database that is collectively maintained by the nodes 110A-110F. It is contemplated, however, that in some embodiments, a particular subset of the nodes 110A-110F can be specifically designated for performing a subset of or all node operations described herein. In this regard, as opposed to embodiments where each node is a peer with other nodes, some embodiments can employ specially "designated nodes" (generally in private blockchains or ecosystems where centralization is not a concern) that perform a subset of or all of the described node operations.

In accordance with embodiments described herein, the immutable database collectively maintained by the nodes 110A-110F is referenced herein as a blockchain. The blockchain maintained by the distributed ledger network 100 includes a plurality of records that are generally considered immutable by virtue of the distributed nature of the distributed ledger network 100, applied cryptography concepts, and a consensus component (not shown) that is independently included and operated by any number of nodes 110A-110F. While any node can generate a transaction to be added to the blockchain, the consensus component specifies that the record be added to the blockchain only based on a determination that a consensus (e.g., greater than 50%) of the nodes 110A-110F (or designated nodes) has collectively validated the transaction. In this regard, while each node 110A-110F can independently store a copy of the blockchain, a record can only be added to the blockchain when a consensus to add the record has been reached by the nodes 110A-110F (or designated nodes) of the distributed ledger network 100.

As described above, nodes can validate transactions before the transactions are added to a blockchain. In various embodiments, validation of a transaction is facilitated utilizing features of asymmetric key cryptography (i.e., public-private key pairs), among other things. In some aspects, as is commonly known in public blockchains (e.g., Bitcoin), a private key can be employed to generate one or more associated public keys, encrypt data that can only be decrypted by an associated public key, and/or digitally sign data or transactions. On the other hand, a public key can be employed to decrypt data encrypted by an associated private key, encrypt data that only the private key can decrypt, and/or digitally authenticate a digital signature generated by an associated private key. As public keys can be shared freely, public keys generally function as "wallet addresses" that are associated with a private key. In this regard, digital tokens or other units of value (e.g., Bitcoin) can be "transmitted" from one wallet address (i.e., a public key of a sender) to another wallet address (i.e., a public key of a receiver). In actuality, however, the transmission of a digital token or unit of value is not a physical transfer, but is represented as a record of transfer from one wallet address to another that, if validated, is recorded onto the blockchain. The record is not finalized (i.e., added to the blockchain), however, until the transfer is validated by a consensus of the nodes 110A-110F in the distributed ledger network 100.

To generate a transaction to transfer a digital token(s) or value, the owner of the sending wallet address digitally signs the transaction with the private key associated with the sending wallet address. Nodes 110A-110F (or designated nodes) of the distributed ledger network 100 independently determine that the transaction from the sending wallet address is valid by digitally authenticating the digital signature with the sending wallet address (i.e., the public key). The nodes 110A-110F (or designated nodes) also independently determine, by referencing their independently-stored copy of the blockchain, that the sending wallet address is in fact associated with the digital token being transferred, or that the sending wallet address has sufficient liquidity (i.e., has a calculated aggregate value based on associated records in a local copy of the blockchain) to transfer the unit(s) of value. If a node (or designated node) in the distributed ledger network 100 determines that either of the foregoing conditions is not satisfied, the transaction can be determined invalid by the node and the transaction is not passed on (e.g., communicated) to other nodes (or designated nodes) to which it is connected. On the other hand, if the node (or designated node) determines that both of the foregoing conditions are satisfied, the transaction can be determined valid and the node passes on (e.g., communicates) the transaction, along with an indication that the node independently validated the transaction, to other nodes 110A-110F (or designated nodes) to which it is connected. As the nodes 110A-110F in the distributed ledger network 100 are all directly or indirectly connected to one another, this validation process continues until the nodes (or designated nodes) collectively determine that a consensus (e.g., majority) has validated the transaction. The collective determination of consensus can be facilitated by virtue of each node (or designated node) maintaining a list of other nodes (or designated nodes) on the network (e.g., by I.P. address or other identifier) along with their respective determinations of transaction validity.

After a consensus of validity for a transaction has been reached by the nodes 110A-110F (or designated nodes), the transaction awaits confirmation (i.e., addition to the blockchain). As the nodes 110A-110F (or designated nodes) can be peers with each other, any node (or designated node) can participate in the process of adding the transaction to the blockchain. For purposes of background, the blockchain includes records of validated transactions that are grouped into a cryptographically chained series of blocks, whereby each block includes a subset of these records. Any node 110A-110F (or designated node) can perform the process of block generation, which can be implemented in a variety of ways based on a consensus algorithm implemented within its consensus component including, but not limited to, proof of work, proof of stake, proof of authority, practical Byzantine Fault Tolerance, or Federated Byzantine Agreements. As the aforementioned processes for block generation are generally known in the art, additional detail for these processes are not described herein. It is contemplated, however, that any implementation of block generation and consensus determination can be employed in accordance with the present disclosure. More importantly, as the general outcome of block generation is relatively similar among these implementations, the following description is provided irrespective of the block generation aspect of the consensus module.

To add a validated transaction to the blockchain, the transaction is included into a block that is being generated by one of the nodes 110A-110F (or designated nodes) and subsequently validated by a consensus of the nodes (or designated nodes) in the distributed ledger network 100. The transaction can be independently included into a block, or grouped together with other transactions, either of which are included within the purview of the present disclosure. Such implementations may vary, however, based on consensus component design and/or a block size (i.e., memory limitation) implemented or defined within the consensus component operated by the nodes 110A-110F (or designated nodes). The node generating the block also includes, into the block it is generating, a cryptographic hash of the block most-recently added to the blockchain. Once generated in accordance with consensus rules defined within the consensus component, the node generating the block can send the generated block to the nodes (or designated nodes) to which it is connected.

The nodes (or designated nodes) receiving the generated block can then verify that the block includes one or more valid transactions, includes a hash value of the block most-recently added to the blockchain, and was generated in accordance with the defined consensus rules. Upon verifying the foregoing, the nodes (or designated nodes) can pass on (e.g., communicate) the verified block to its neighboring nodes (or neighboring designated nodes). In this way, similar to how a transaction is validated by a determined consensus of the distributed ledger network 100, the generated block including at least the transaction can be verified by another determined consensus of the nodes (or designated nodes). When a determination is made by a consensus of the nodes 110A-110F (or designated nodes) that a block is verified, the newly-verified block is added to the blockchain immediately subsequent to the previously-added block, the hash of the previously-added block being included in the newly-verified block. As such, each block is cryptographically "chained" to a previous block and a subsequent block. In other words, the cryptographic hashes facilitate maintenance of the order and accuracy of records included in the blockchain.

In some instances, if the same transaction is included into a block generated by different nodes (or designated nodes) and validated throughout the network within a substantially similar timeframe, the blocks can be temporarily confirmed leading up to a fork in the blockchain (e.g., two potential branches stemming from the main chain). The forked chain can be maintained by the nodes (or designated nodes) until a determination is made, by a consensus of the distributed ledger network 100, that one of the forks has a larger quantity of blocks than the other. Based on a subsequent determination that one of the forks is shorter than the other, the nodes (or designated nodes) can prune (e.g., delete) the shorter chain, and maintain the longer chain as the determinative blockchain.

As can be appreciated, the blockchain is not limited to storing records relating to transfers of digital tokens or monetary value. In this regard, a record can include any type of electronic record, including but not limited to one or more transactions, smart contracts, electronic documents, images or other digital media, URIs, alphanumeric text, unique identifiers, IP addresses, timestamps, hashes of any of the foregoing, or references to any of the foregoing. Any of the foregoing examples can be viewed as being the subject of a transaction, or can be indirectly associated with a transaction. For instance, ownership of an asset stored in a medium other than the blockchain (e.g., a remote storage device, a cloud server, a database) can be referenced with a unique identifier. If the asset is a digital asset, a URI and/or hash of the digital asset can be the subject of the transaction. If the asset is a tangible asset, a unique identifier associated with the tangible asset can be the subject of the transaction. It is contemplated that any combination or alternative to the foregoing examples remain within the purview of the present disclosure.

In accordance with embodiments of the present disclosure, nodes 110A-110F in the distributed ledger network 100 include a block reduction manager 122. At a high-level, the block reduction manager 122 operates to reduce or remove blocks added to the blockchain. In particular, as the number of blocks in a blockchain can be extensive thereby utilizing an excessive amount of memory, the block reduction manager 122 can manage the blockchain to reduce its size. As described in more detail below with respect to FIG. 3, the block reduction manager 122 generally identifies when to reduce or remove blocks in the blockchain and an amount or size by which to reduce the blockchain. As described, reducing the blockchain size reduces the amount of memory required to store the blockchain, thereby improving performance of each node.

Figure 2:
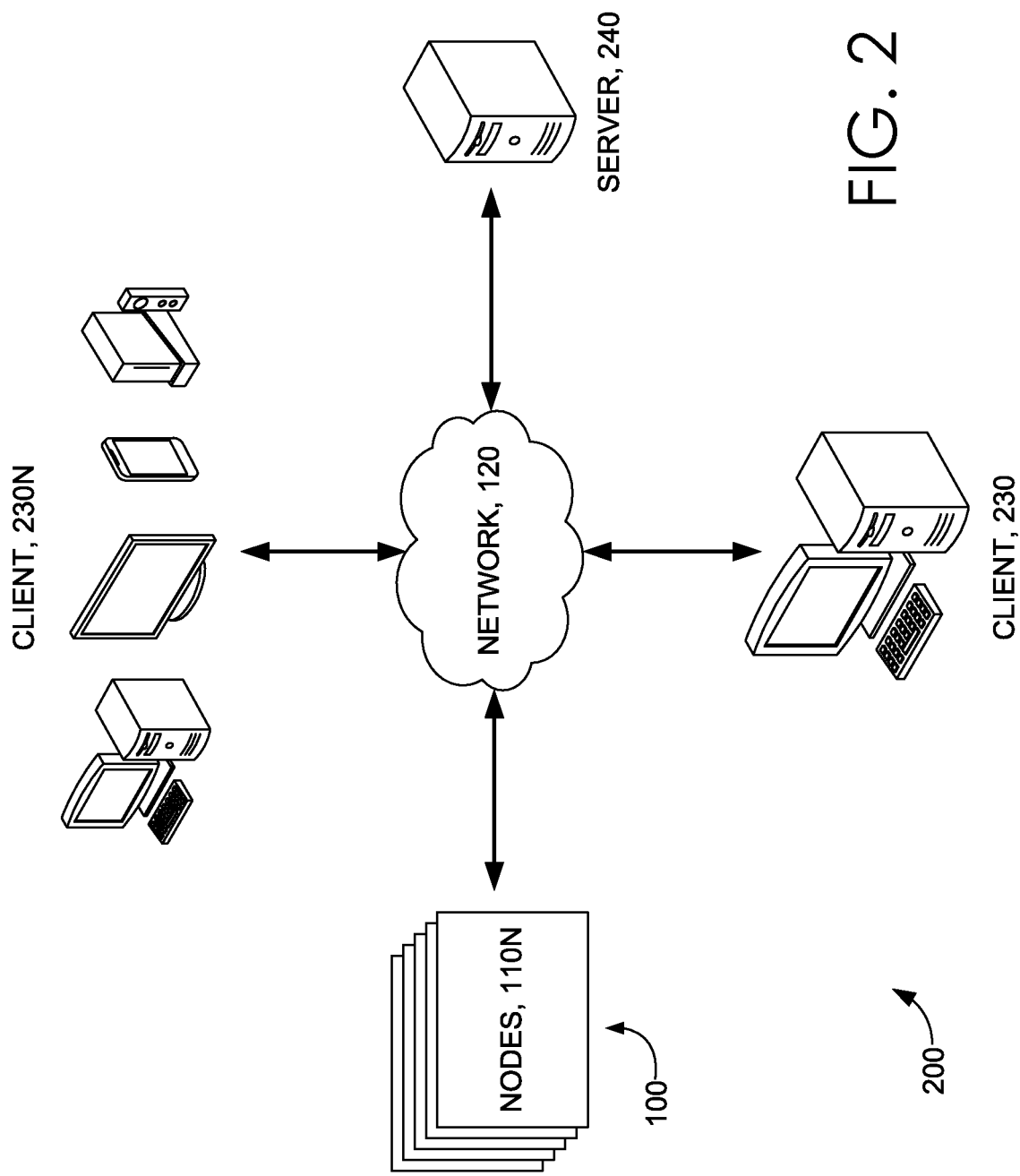
FIG. 2 is an exemplary system in accordance with some embodiments of the present invention.

Referring now to FIG. 2, a schematic depiction is provided illustrating an exemplary system 200 in which some embodiments of the present invention may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 200 can include, among other things, a distributed ledger network 100 comprising a plurality of nodes 110N as described with reference to FIG. 1, each in direct or indirect communication with one another via a network 120. It is contemplated that the nodes 110N can include a subset of designated nodes authorized to perform specifically-designated operations, such as validation, verification, or block generation, among other things. The system can also include one or more client devices, such as client 230, 230N. It is contemplated that any one or more nodes 110N can be a client 230, 230N, and one or more clients, 230, 230N can be a node in accordance with embodiments described herein. In this regard, nodes 110N and clients 230, 230N are computing devices also described herein in accordance with FIG. 7.

In one aspect, a client 230, 230N and can include the consensus component similarly included in other nodes 110N (or designated nodes) within the distributed ledger network 100. In another aspect, the client 230, 230N can generate transactions that can initially be validated locally, via the consensus component included therein, before the transaction is passed on to other nodes. In another aspect, a client 230, 230N can be in communication with one or more nodes 110N via the network 120, and can locally generate a transaction for communication via the network 120 to one or more nodes 110N that the client 230, 230N is in communication with. In this way, the one or more nodes 110N (or designated nodes) receiving the transaction directly or indirectly from the client 230, 230N can validate the transaction in accordance with the present disclosure.

In some aspects, any node 110N can operate as a node that includes a consensus component, and any client 230, 230N can operate as a client device that can: transmit communications to one or more nodes 110N, generate transactions, and receive communications (e.g., transaction status, blockchain data) from one or more nodes 110N. For purposes of simplicity, the following description will reference a client 230, 230N as a node 110*n*, though embodiments are not limited as such.

In some embodiments, the system 200 can further include a server device, such as server 240. The server 240 can be in communication with one or more nodes 110N to send generated transactions to the one or more nodes 110N, request and receive transaction status information from the one or more nodes 110N, and/or request and receive blockchain data from the one or more nodes 110N, among other things. In some further embodiments, server 240 can include can include one or more computing devices, also described in accordance with FIG. 7, whereby the one or more computing devices can include a consensus component to operate as a node 110N (or designated node). Among other things, the server 240 can further provide one or more services, such as data storage services, web hosting services for one or more websites, user authentication services, certificate authentication services, backup services, data mining services, "cloud"-stored data or web search services, block explorer services, analytics services, and the like, including any combination thereof.

Figure 3:
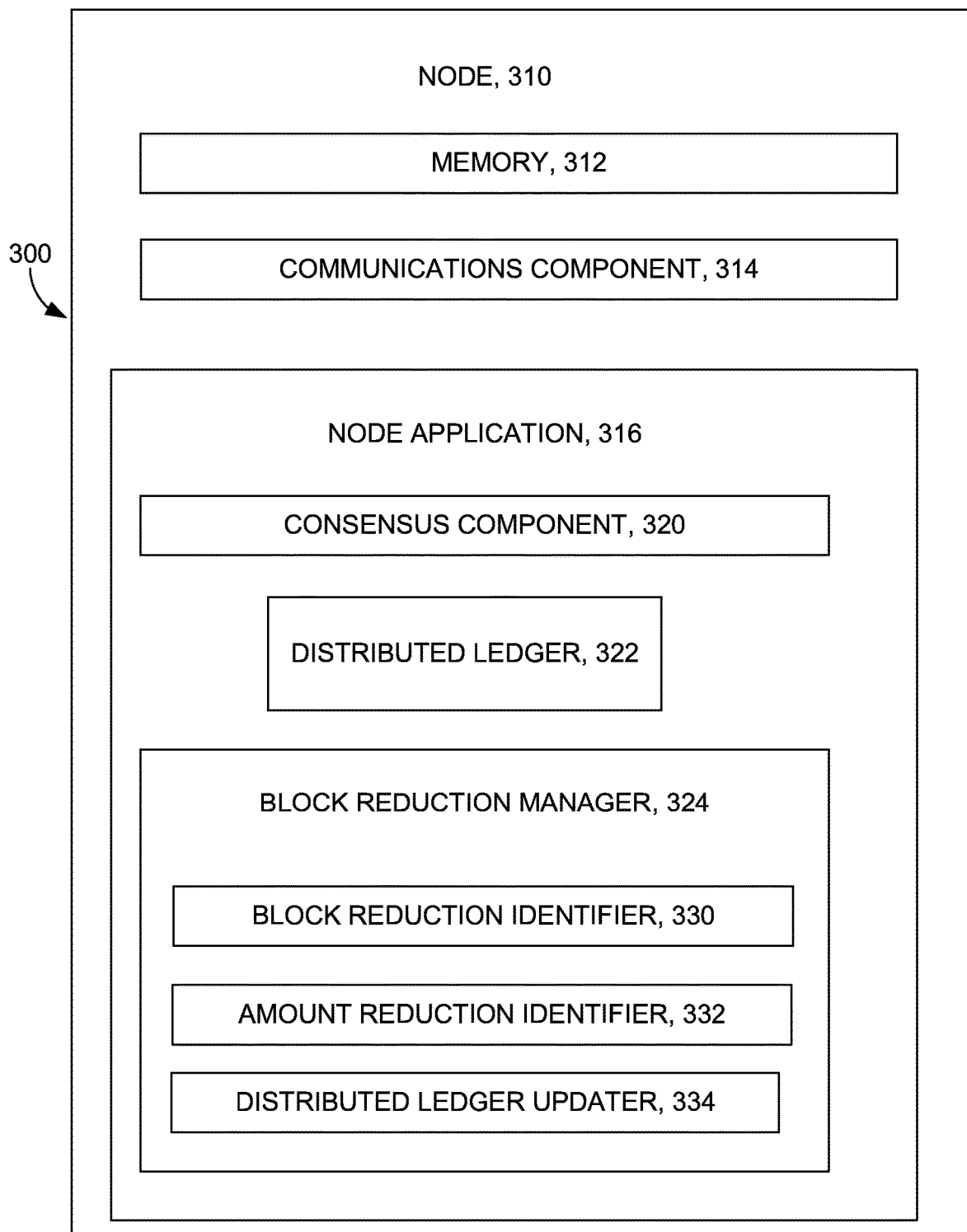
FIG. 3 is a block diagram depicting an exemplary node of a distributed ledger network in accordance with some embodiments of the present invention.

Turning now to FIG. 3, a block diagram 300 is provided depicting exemplary components of a node 310 in accordance with the present disclosure. In embodiments, node 310 may represent node 110N of FIG. 2. As described, node 310 facilitates implementation of a distributed ledger that can record various transactions in a distributed ledger network.

The node 310 depicted in FIG. 3 can include, among other things, a memory 312, a communications component 314, and a node application 316. The memory 312 can include any type of memory, such as a hardware storage device, random access memory (RAM), a cache, read-only memory (ROM), and the like, including any combination thereof. The memory 312 can be employed to store executable computer code that, when executed by one or more processors of the node 310, perform operations defined and/or implemented within the node application described herein. The memory 312 can also be employed to store data communicated from other nodes, clients, and/or servers, such as those described in accordance with FIG. 2. Data stored in memory can include, among other things, transactions, one or more blocks of a blockchain, determinations of validity, determinations of authentication/verification, unique identifiers and/or IP addresses of one or more nodes, and other types of electronic data not limited to the foregoing.

The communications component 314 generally facilitates communication of data to and from the node 310 to other devices, such as other nodes, clients, and/or servers. The communications component 314 can include any type of communications device that enables the node 310 to communicate with other nodes, such as those described in accordance with FIG. 2. Communications can be facilitated utilizing wired or wireless communications, and can employ any short or long-range communications technology including, but not limited to, LANs, WANs, Ethernet, the Internet, WiFi, Bluetooth, NFC, optics (e.g., QR codes, Infrared), Zigbee, radio, RFIDs, and the like.

The node application 316 is generally configured to enable node 310 to participate in a distributed ledger or blockchain ecosystem(s). In this regard, the node application enables the node 310 to operate as a peer node (or a peer to other "designated" nodes) in a distributed ledger network, such as distributed ledger network 100 described in accordance with FIG. 1. To this end, the node application 316 can facilitate implementation of a distributed ledger that records various transactions (e.g., cryptocurrency transactions, etc.) in the form of blocks within a blockchain.

As shown in FIG. 3, the node application 316 includes a consensus component 320, a distributed ledger 322, and a block reduction manager 324. Although illustrated with components 320, 322, and 324, the node application 316 can include any number of components or subcomponents. Further, each of components 320, 322, and/or 324 may operate independent of or in communication with a node application. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The consensus component 320 is generally configured to facilitate consensus among nodes in a distributed ledger environment, for example, such that the nodes within the distributed ledger environment arrive at a single view or representation of the distributed ledger 324. The consensus component 320 can provide the rules or guidelines for arriving at a consensus for decisions among nodes. As can be appreciated, various distributed ledger environments (or ecosystems) can have different methods for attaining consensus. The consensus component 320 may have various methods and applications, some of which are discussed below with respect to the block reduction manager.

The distributed ledger 322 refers to a data structure that includes various records (e.g., cryptocurrency transactions), generally referred to herein as blocks. In this regard, the distributed ledger includes a sequence of blocks (a blockchain). As described above, each block may include a cryptographic hash of a previous block, a timestamp, and transaction data (e.g., represented as a merkle tree root hash). Typically, data can be recorded as a block in the distributed ledger 322 upon attaining consensus, such as consensus attained via consensus component 320.

The block reduction manager 324 is generally configured to facilitate block reduction within a blockchain. In this way, the block reduction manager 324 can manage the size of the distributed ledger such that the distributed ledger does not utilize an extensive amount of memory.

As can be appreciated, in operation, the block reduction manager 324 and/or the node application 316 having the block reduction technology may be provided to the node 310 upon consensus of implementing block reduction. In this regard, an initial node application without block reduction technology operating at a node can be supplemented or replaced with block reduction technology, such as block reduction manager 324. Utilizing consensus, block reduction can be applied consistent across nodes in the distributed ledger network such that the nodes contain the same information within the corresponding distributed ledgers.

Consensus to incorporate block reducing technology may be facilitated by the consensus component 320. As can be appreciated, consensus to utilize block reducing technology may be obtained in any number of ways. By way of example only, upon a proposed suggestion to implement a block reduction technology, a vote can be conducted (e.g., occurring within a particular time period). As described below, the suggested block reduction technology for implementation can be in any number of forms (e.g., when to reduce the blockchain and/or extent to reduce the blockchain). A proposed block reduction technology may be provided in any number of manners, such as, for instance, an alert or notification requesting to update the node application operating on the node to include block reducing technology. Upon arriving at a consensus (e.g., majority, exceed threshold percent, etc.) as indicated via the voting, the block reduction technology can be implemented at the nodes, such as node 310. In this regard, a new version of the node application may be implemented, or an add-on or modification to an operating node application may be implemented. Such a new version of the node application or node application add-on/modification information may be provided to a node by a server or other component (e.g., other node, client device).

In embodiments, the block reduction manager 324 includes a block reduction identifier 330, an amount reduction identifier 332, and a distributed ledger updater 334. As described, the block reduction manager 324 facilitates reduction of blocks to decrease the size of the distributed ledger. Although illustrated with components 330, 332, and 334, the block reduction manager 324 can include any number of components or subcomponents. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether.

The block reduction identifier 330 is generally configured to identify an indication to reduce a size of a blockchain, also referred to herein as block reduction triggers. As previously described, a block reduction trigger generally refers to a trigger, such as an event, result, attribute, or the like, that triggers or indicates a blockchain size reduction should occur. In this regard, identification of a block reduction trigger can initiate a reduction of blocks within a blockchain. As one example, a block reduction trigger may be a size associated with a blockchain (e.g., a size of a blockchain, a number of blocks in a blockchain, etc.). To this end, a block reduction trigger can be identified when the blockchain is of a particular size or contains a particular number of blocks. As another example, a block reduction trigger may be a time or time duration (e.g., time duration since a first block in the blockchain). In this regard, timestamps associated with blocks in the blockchain may be used to identify the block reduction trigger. As yet another example, a block reduction trigger may be a rate of change at which blocks are added to a blockchain. For instance, a block reduction trigger may occur when a particular rate of change occurs or is exceeded.

In some cases, a block reduction setting, such as a threshold value, may be used to identify a block reduction trigger. In this way, a block reduction setting, such as a threshold value, can be compared to blockchain data to identify a block reduction trigger. Blockchain data generally refers to information related to the blockchain, such as size of blockchain, number of blocks in blockchain, etc. By way of example only, assume that a blockchain size threshold is utilized to identify block reduction triggers. In such a case, upon the blockchain size exceeding the blockchain size threshold, a block reduction trigger can be identified. As another example, assume that a block number threshold is utilized to identify block reduction triggers. In such a case, upon the number of blocks within a blockchain exceeding the block number threshold, a block reduction trigger can be identified.

As can be appreciated, in some implementations, multiple block reduction settings can be established such that identification of a block reduction trigger in association with any of the block reduction settings can initiate block reduction. For example, assume a first block reduction setting indicates that a particular blockchain size should initiate a blockchain reduction and a second block reduction setting indicates that a particular number of blocks in the blockchain should initiate a blockchain reduction. In such a case, upon identifying a block reduction trigger of either attaining the particular number of blocks or size of the blockchain, block reduction can be initiated.

An amount reduction identifier 332 is generally configured to identify a size or amount to reduce a blockchain. In this way, in accordance with determining to reduce the quantity of blocks in a blockchain, the amount or size for which to reduce can be identified. A size or amount to reduce a blockchain may be indicated by a number of blocks, a block number, a size of blocks, a percent of blocks, a set of blocks, or the like. For instance, an amount may be specified as removing 100 blocks from the blockchain (e.g., a first 100 blocks in the blockchain). As another example, an amount may be specified as removing blocks to attain 100 blocks in the blockchain. As yet another example, an amount may be specified as removing blocks prior to current block number 100 or after current block 100. As yet another example, a percent of blocks (e.g., 50%) of a total number of blocks may be specified for removal.

Identification of the size or amount to reduce a blockchain can occur in various manners, some of which are described herein. As one example, a size to reduce a blockchain may be a predetermined amount based on the block reduction trigger. In some cases, a reduction amount may be a default amount that is utilized irrespective of the block reduction trigger. In this regard, irrespective of whether a first type of block reduction trigger is identified or whether a second type of block reduction trigger is identified, the default reduction amount can be identified for use in reduce a size of a blockchain. In other cases, a reduction amount may be a predetermined size based on the particular block reduction trigger identified. For example, in this manner, if a first type of block reduction trigger is identified, a first reduction amount may be identified. On the other hand, if a second type of block reduction trigger is identified, a second reduction amount may be identified.

As another example, an amount to reduce a blockchain may be determined in accordance with blockchain data. For instance, when a blockchain exceeds a first size, the blockchain may be reduced by a first amount (e.g., 20%), and when a blockchain exceeds a second size, the blockchain may be reduced by a second amount (e.g., 50%). In this regard, the reduction amount may vary depending on data specific to the blockchain. As another example, heuristics may be used to identify a reduction amount based on a rate of change of block addition to a blockchain (e.g., such that a block reduction is effective to forego block reduction for another year).

The distributed ledger updater 334 is generally configured to update the distributed ledger in accordance with the identified reduction amount to reduce the blockchain. In particular, the distributed ledger updater 334 can remove or delete blocks identified to be removed to reduce the length or size of the blockchain. In this regard, the distributed ledger updater 334 can identify and remove a particular set of one or more blocks to remove based on the amount of block reduction identified. For example, assume 100 blocks exist and a determination is made to reduce the blocks to 10 blocks. In such a case, the distributed ledger updater 334 can identify and remove blocks 1-90.

In operation, to maintain information corresponding with removed blocks, a state of the transactions recorded in the blocks to be removed from the blockchain can be determined and recorded (e.g., at new block 0 in the blockchain). Such a recorded transaction state can capture a representation (e.g., value, currency value) of the transactions being removed for reference by blocks maintained in the blockchain. As used herein, a transaction state can summarize or represent a state of transactions associated with blocks identified to remove from the blockchain. As such, the transaction state enables a state of transactions at a point in time to be known even though blocks are being removed from the blockchain.

Figures 4A, 4B:
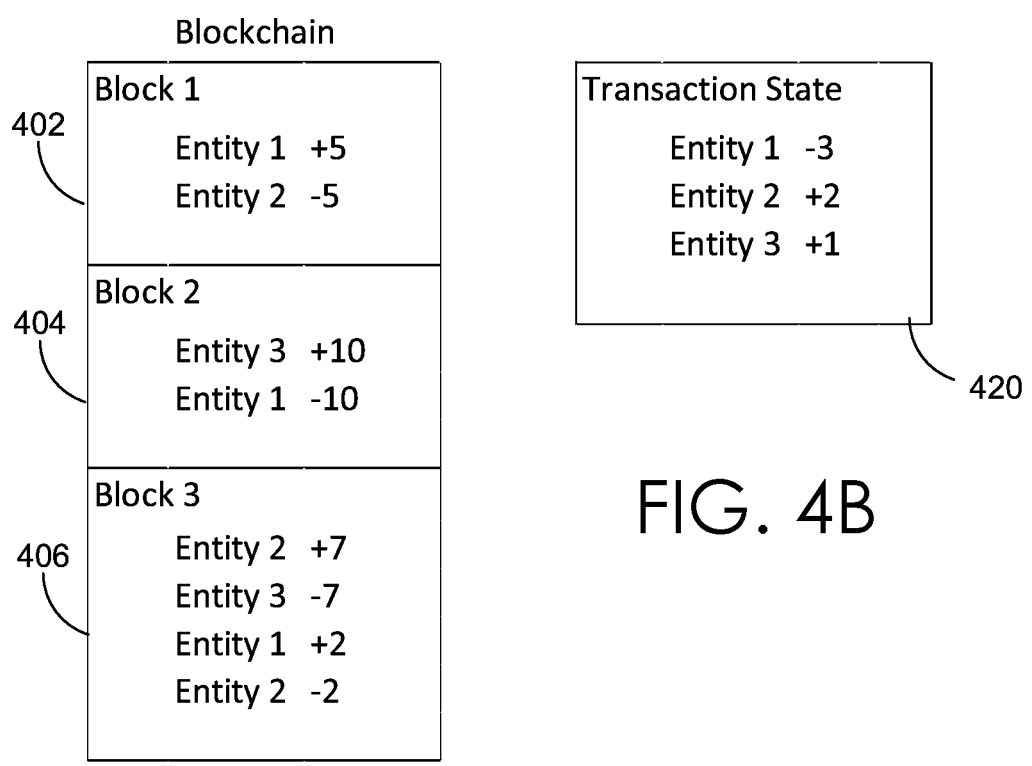
FIGS. 4A-4B provides an example blockchain and generated transaction state according to some embodiments of the present invention.

In one embodiment, to identify a transaction state for each entity or identifier associated with a set of transactions, a transaction state can be determined by aggregating the values of the corresponding transactions. By way of example, and with reference to FIG. 4A-4B, an example transaction state in accordance with a blockchain is illustrated. With reference to FIG. 4A, blocks 402, 404, and 406 are presented. A set of block transactions is included within each block. In block 1 402, a set of transactions shows an increase of 5 corresponding with entity 1 and a decrease of 5 corresponding with entity 2. In block 2 404, a set of transactions shows an increase of 10 corresponding with entity 3 and a decrease of 10 corresponding with entity 1. In block 3 406, a set of transactions shows an increase of 7 corresponding with entity 2, a decrease of 7 corresponding with entity 3, an increase of 2 corresponding with entity 1, and a decrease of 2 corresponding with entity 3. Assume that it is determined to remove blocks 1, 2, and 3. In such a case, a transaction state associated with entity 1 may be determined by aggregating +5, −10, and +2, resulting in a transaction state of −3. A transaction state associated with entity 2 may be determined by aggregating −5 and +7, resulting in a transaction state of +2. A transaction state associated with entity 3 may be determined by aggregating +10, −7, and −2, resulting in a transaction state of +1. As shown in FIG. 4B, a transaction state 420 may be generated. Such a transaction state 420 includes an identification of each entity (e.g., address or other identifier) and a current state or value associated with the entity based on information included in the blocks identified to be removed.

As can be appreciated, a transaction state may be in any number of forms and the transaction state 420 is provided as an example. Further, the values provided in the blocks in FIG. 4A and the transaction state 4B are provided for illustration purposes. As can be appreciated, other values may be utilized. The transaction state 420 may be included within the blockchain (e.g., a first block in the modified blockchain, a last block in the modified blockchain, a replacement block for the removed blocks, etc.) or accessible by the blockchain.

Further, as can be appreciated, a hash value can be included in a block containing the transaction state. As described, a blockchain is a linked list that includes data and a hash value that points to a previous block. As such, in cases that a block is generated to include a transaction state (e.g., transaction state 420) and replace one or more blocks to be removed or added to the modified blockchain, a hash value can be generated for the newly generated block with the transaction state. For instance, a hash value can be generated that represents the transactions within the blocks to be removed, represents the transaction state data within the new block, or a combination thereof. As one specific example, in some implementations, hashes from blocks identified to remove from the blockchain can be used as input to calculate a new hash. The new hash can then be included in the block with transaction state data. Other implementations may include other blockchain redaction capabilities, such as, for example, a "Chameleon Hash." A Chameleon Hash can be used along with a standard hash between blocks. In this way, when a new block is generated, valid hashes can be created that link the block (e.g., block containing the transaction state data) to a predecessor and/or successor block. As the Chameleon hash values for the old and new block remain the same, the new block can hash to the blockchain.

As can be appreciated, in some embodiments, prior to reducing the blocks in the blockchain or distributed ledger, a consensus may be required to be obtained. In this regard, upon identifying to reduce the blockchain, an amount of which to reduce a blockchain, and/or a set of blocks to remove, a consensus signal may be initiated to obtain a consensus before updating the distributed ledger. The consensus signal may include an indication of the blocks identified to remove from the blockchain, an amount of blocks to remove, an indication of the transaction state(s), and/or the like. Upon obtaining validation that a consensus (e.g., majority) related to block reduction is achieved, the distributed ledger or blockchain can be updated or modified to remove the appropriate blocks and, if appropriate, add a transaction state (e.g., as a block in the blockchain). In embodiments, the consensus component 320 can be used to facilitate consensus of the block reduction.

Figure 5:
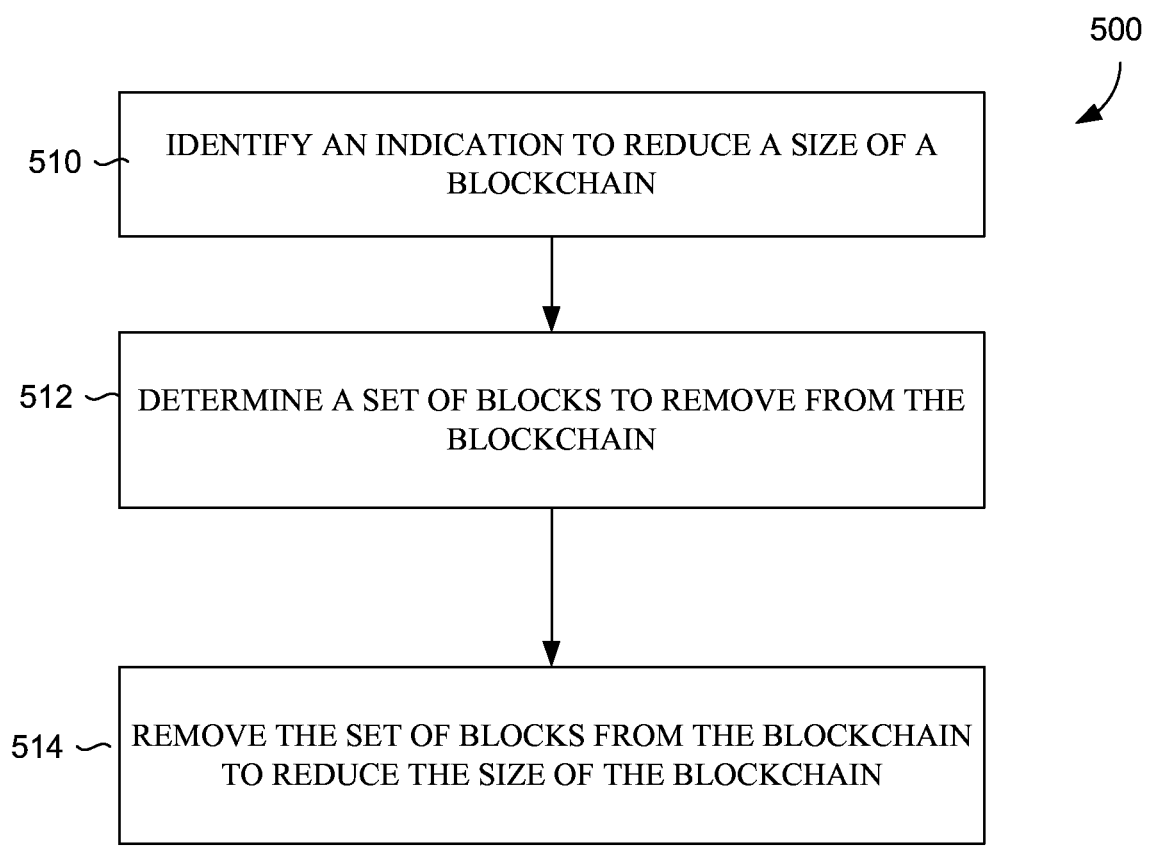
FIG. 5 is a flow diagram showing a method for reducing block quantity in distributed ledgers, in accordance with some embodiments of the present invention.

Turning now to FIG. 5, a flow diagram is provided that illustrates a method 500 for reducing block quantity in distributed ledgers. The method 500 can be implemented, for example, via node 310 of FIG. 3. Initially, as indicated at block 510, an indication to reduce a size of a blockchain is identified. An indication to reduce a blockchain size can be identified in any number of ways. For example, such an indication can be identified by identifying that a size of the blockchain exceeds a size threshold, identifying that a number of blocks in the blockchain exceeds a block number threshold, identifying that a time duration has elapsed since a previous size reduction of the blockchain, identifying a rate of change of adding blocks to a blockchain exceeds a rate threshold, or the like.

At block 512, a set of blocks to remove from the blockchain is determined. Determining the set of blocks to remove from the blockchain can be performed in any number of ways, some of which are described herein. As one example, determining the set of blocks to remove from the blockchain includes identifying an amount of blocks to remove the blockchain, and based on the amount of blocks, determining the set of blocks to remove from the blockchain. As another example, determining the set of blocks to remove from the blockchain can be based on a number of blocks to remove the blockchain, a total size of blocks to remove from the blockchain, a block number to which to reduce the blockchain, a percent of blocks to remove from the blockchain, and/or the like.

At block 514, the determined set of blocks is removed from the blockchain to reduce the size of the blockchain. Advantageously, the amount of memory used by the blockchain is reduced. In implementation, a transaction state corresponding with the transactions in the set of blocks to remove can be determined and input into a newly created block for the blockchain. This enables the state of the transactions to be effectively known and used despite removal of the blocks.

Figure 6:
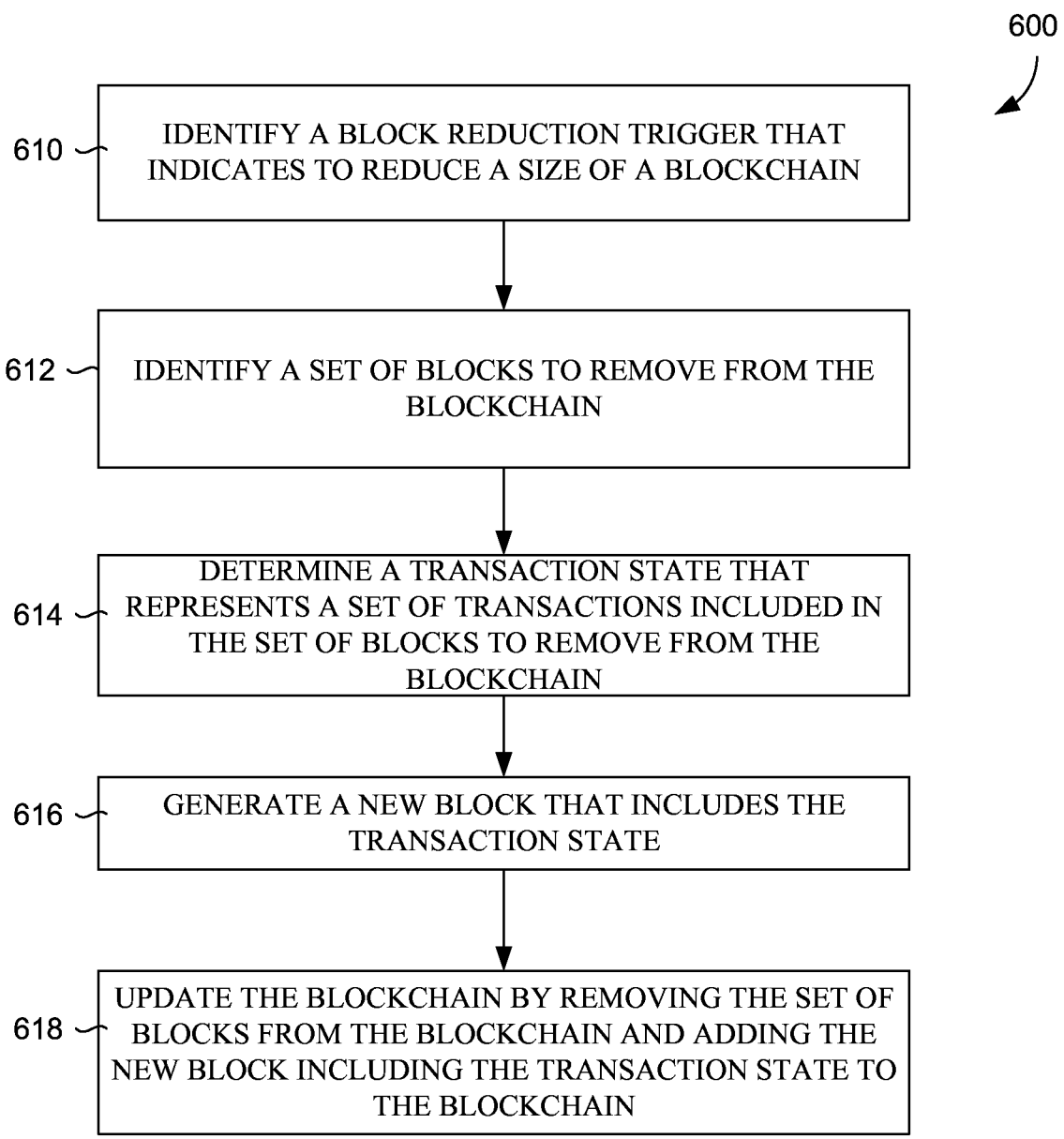
FIG. 6 is a flow diagram showing another method for reducing block quantity in distributed ledgers, in accordance with some embodiments of the present invention.

Referring now to FIG. 6, a flow diagram is provided that illustrates another method 600 for reducing block quantity in distributed ledgers. The method 600 can be implemented, for example, via node 310 of FIG. 3. Initially, as indicated at block 610, a block reduction trigger that indicates to reduce a size of a blockchain is identified. A block reduction trigger can be identified in any number of ways. For example, such an indication can be identified by identifying that a size of the blockchain exceeds a size threshold, identifying that a number of blocks in the blockchain exceeds a block number threshold, identifying that a time duration has elapsed since a previous size reduction of the blockchain, identifying a rate of change of adding blocks to a blockchain exceeds a rate threshold, or the like.

At block 612, a set of blocks to remove from the blockchain is identified. Determining the set of blocks to remove from the blockchain can be performed in any number of ways, some of which are described herein. As one example, determining the set of blocks to remove from the blockchain includes identifying an amount of blocks to remove the blockchain, and based on the amount of blocks, determining the set of blocks to remove from the blockchain. As another example, determining the set of blocks to remove from the blockchain can be based on a number of blocks to remove the blockchain, a total size of blocks to remove from the blockchain, a block number to which to reduce the blockchain, a percent of blocks to remove from the blockchain, and/or the like. In some cases, a signal is generated to obtain a consensus of the set of blocks identified to remove from the blockchain.

At block 614, a transaction state is determined. A transaction state represents a set of transactions included in the set of blocks to remove from the blockchain. In embodiments, a transaction state includes a representation of a value for each entity corresponding with the set of transactions included in the set of blocks to remove from the blockchain.

Figure 7:
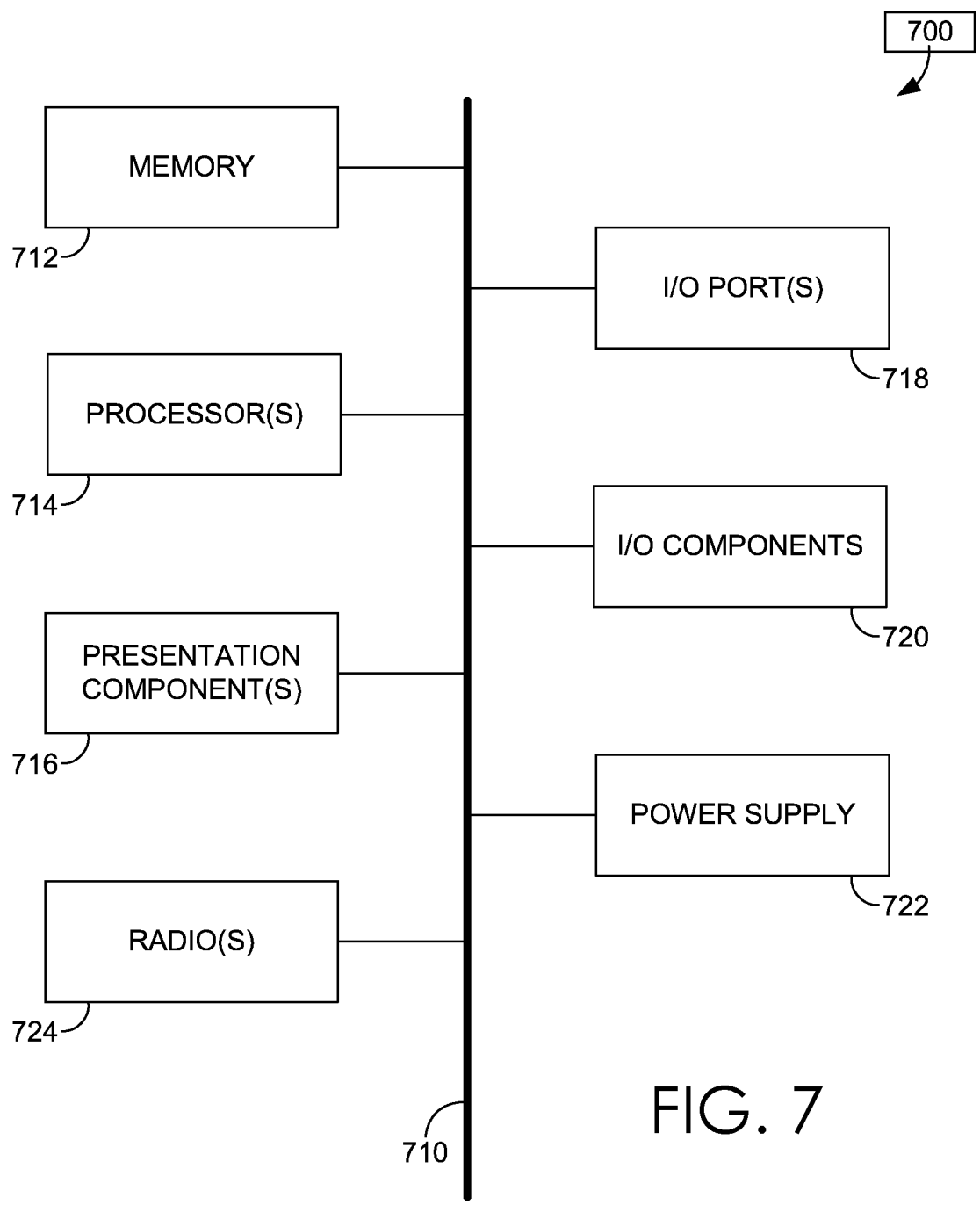
FIG. 7 is a block diagram of an exemplary computing environment suitable for use in implementing some embodiments of the present invention.

At block 616, a new block is generated that includes the transaction state. In embodiments, a signal is generated to obtain consensus of the new block. At block 618, the blockchain is updated by removing the set of blocks from the blockchain and adding the new block including the transaction state to the blockchain. Advantageously, reducing the number of blocks in the blockchain reduces memory utilized by the blockchain Having described embodiments of the present invention, an exemplary operating environment in which embodiments of the present invention may be implemented is described below in order to provide a general context for various aspects of the present invention. Referring to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output (I/O) ports 718, input/output components 720, and an illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be equipped with depth cameras, such as stereoscopic camera systems, infrared camera systems, RGB camera systems, touchscreen technology, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

As can be understood, embodiments of the present invention provide for, among other things, facilitating reduction of blocks in a blockchain. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A computer-implemented method for reducing blockchain size, the method comprising:
identifying, by a node of a distributed plurality of nodes, an indication to reduce a size of a blockchain, having a plurality of blocks that include an ordered set of transactions, by a reduction amount value that indicates an amount that the size of the blockchain is to be reduced;
identifying an amount of blocks to remove from the blockchain;
determining, based on the identified amount of blocks to remove from the blockchain, by the node of the distributed plurality of nodes, a set of blocks to remove from the blockchain, such that removing the set of blocks to remove will satisfy the reduction amount value;
transmitting a consensus signal to the distributed plurality of nodes indicating the set of blocks to remove from the blockchain; and
removing, by the node of the distributed plurality of nodes, the set of blocks from the blockchain to reduce the size of the blockchain to satisfy the reduction amount value, wherein the size of the blockchain indicates a quantity of blocks in the plurality of blocks.

2. The computer-implemented method of claim 1, wherein identifying the indication to reduce the size of the blockchain comprises identifying that the size of the blockchain exceeds a size threshold.

3. The computer-implemented method of claim 1, wherein identifying the indication to reduce the size of the blockchain comprises identifying that a number of blocks in the blockchain exceeds a block number threshold.

4. The computer-implemented method of claim 1, wherein identifying the indication to reduce the size of the blockchain comprises identifying that a time duration has elapsed since a previous size reduction of the blockchain.

5. The computer-implemented method of claim 1, wherein identifying the indication to reduce the size of the blockchain comprises identifying a rate of change of adding blocks to a blockchain exceeds a rate threshold.

6. The computer-implemented method of claim 1, wherein determining the set of blocks to remove from the blockchain is based on a number of blocks to remove the blockchain.

7. The computer-implemented method of claim 1, wherein determining the set of blocks to remove from the blockchain is based on a total size of blocks to remove from the blockchain.

8. The computer-implemented method of claim 1, wherein determining the set of blocks to remove from the blockchain is based on a block number to which to reduce the blockchain.

9. The computer-implemented method of claim 1, wherein determining the set of blocks to remove from the blockchain is based on a percent of blocks to remove from the blockchain.

10. The computer-implemented method of claim 1, wherein the set of blocks are removed from the blockchain to reduce the size of the blockchain based on attaining a consensus of the set of blocks to remove.

11. The computer-implemented method of claim 1 further comprising:
generating a transaction state that represents the state of transactions included in the set of blocks removed from the blockchain; and
generating a new block that contains the transaction state; and
adding the new block to the blockchain.

12. One or more computer storage media storing computer-useable instructions that, when used by one or more computing devices, cause the one or more computing devices to perform operations comprising:
identify a block reduction trigger that indicates to reduce a size of a blockchain, the blockchain having a plurality of blocks;
identify a set of blocks to remove from the blockchain;
determine a transaction state comprising a current value that is based on an aggregation of values included in a set of transactions included in the set of blocks to remove from the blockchain, and further comprising an identifier associated with the set of transactions included in the set of blocks to remove from the blockchain, and further comprising a plurality of transaction values determined based on an aggregation of values included in the set of transactions included in the set of blocks to remove from the blockchain, each transaction value of the plurality of transaction values associated with an entity of a plurality of entities, the plurality of entities corresponding with the set of transactions included in the set of blocks to remove from the blockchain;
generating a signal to obtain a consensus of the identified set of blocks to remove from the blockchain, wherein the signal comprises an indication of the set of blocks to remove from the blockchain, an amount of blocks to remove, or an indication of the transaction state;
generate a new block including a value based on the transaction state;
upon obtaining an indication that the consensus is achieved, update the blockchain by removing the set of blocks from the blockchain and adding the new block including the transaction state to the blockchain, thereby reducing memory utilized by the blockchain.

13. The one or more computer storage media of claim 12, wherein obtaining an indication that the consensus is achieved is based on determining a consensus of a majority of a designated distributed plurality of nodes.

14. The one or more computer storage media of claim 12 further comprising generating a signal to obtain consensus of the new block including the transaction state.

15. A node of a distributed ledger system, comprising:
one or more processors; and
one or more non-transitory computer-readable storage media, coupled with the one or more processors, having instructions stored thereon, which, when executed by the one or more processors, cause the node to perform operations comprising:
identifying an indication to reduce a size of a blockchain, having a plurality of blocks that include an ordered set of transactions;
identifying an amount to reduce a blockchain, by a reduction amount value, wherein the reduction amount value indicates a quantity of blocks in the blockchain; and
determining, based on the identified amount of blocks to reduce the blockchain, by the node of the distributed ledger system, a set of blocks to remove from the blockchain;
transmitting a consensus signal to a distributed plurality of nodes of the distributed ledger system indicating the set of blocks to remove from the blockchain, causing the distributed plurality of nodes to remove the indicated set of blocks from the blockchain;
updating the blockchain by removing the set of blocks in accordance with the reduction amount value to reduce the blockchain, such that removing the set of blocks to remove will satisfy the reduction amount value.

16. The node of claim 15, wherein updating the blockchain further generates a transaction state representing a set of transactions included in the set of blocks to remove from the blockchain.

17. The node of claim 15, wherein the amount to reduce a blockchain is indicated by a number of blocks, a block number, a size of blocks, a percent of blocks, or a combination thereof.

18. The node of claim 15, wherein identifying an indication to reduce a size of a blockchain is based on a blockchain size, a block number, a time, a rate of change at which blocks are added to the blockchain, or a combination thereof.

* * * * *